United States Patent [19]

Garwood

[11] Patent Number: 5,323,590
[45] Date of Patent: Jun. 28, 1994

[54] METHOD OF PRODUCING FOOD PACKAGING WITH GAS BETWEEN TENSIONED FILM AND LID

[75] Inventor: Anthony J. M. Garwood, Knoxfield, Australia

[73] Assignee: Seawell North America, Inc., Wilmington, Del.

[21] Appl. No.: 80,778

[22] Filed: Jun. 24, 1993

Related U.S. Application Data

[60] Division of Ser. No. 873,800, Apr. 27, 1992, Pat. No. 5,226,531, which is a continuation of Ser. No. 499,644, Mar. 27, 1990, Pat. No. 5,155,974, which is a continuation of Ser. No. 328,074, Feb. 23, 1989, abandoned.

[30] Foreign Application Priority Data

| Sep. 3, 1986 | [AU] | Australia | PH7832 |
| Sep. 26, 1986 | [AU] | Australia | PH8237 |
| Feb. 20, 1987 | [AU] | Australia | PI0468 |
| Mar. 16, 1987 | [AU] | Australia | PI0866 |

[51] Int. Cl.⁵ .................... B65B 31/02; B65B 47/04
[52] U.S. Cl. ..................... 53/433; 53/436; 53/441; 53/449; 53/464

[58] Field of Search ................. 53/433, 434, 432, 511, 53/510, 512, 436, 441, 427, 449, 456, 464, 527, 526, 556

[56] References Cited

U.S. PATENT DOCUMENTS

| 3,481,100 | 12/1969 | Bergstrom | 53/433 |
| 3,634,993 | 1/1972 | Pasco et al. | 53/427 X |
| 4,683,702 | 8/1987 | Vis | 53/433 |
| 5,101,611 | 4/1992 | Biskup et al. | 53/433 |
| 5,115,624 | 5/1992 | Garwood | 53/433 X |

Primary Examiner—James F. Coan
Attorney, Agent, or Firm—Foley & Lardner

[57] ABSTRACT

A method of producing packaging in which the goods to be packaged are engaged against a rigid base and a flexible material is held taut over the goods. Portions of the flexible material near the side edges thereof are engaged and moved to a position below the top of the goods. The intermediate portions of the flexible material are tensioned and stretched thereby compressing the goods to the base. A lid is applied over the base so there is a space between the lid and the flexible material which is secured to the base below the goods to maintain the goods against the base. A gas is charged into the space to preserve the goods, ad the lid and flexible material are sealed to the base with the gas in the space.

7 Claims, 8 Drawing Sheets

METHOD OF PRODUCING FOOD PACKAGING WITH GAS BETWEEN TENSIONED FILM AND LID

This application is a division of application Ser. No. 07/873,800, filed Apr. 27, 1992, now U.S. Pat. No. 5,226,531; which is in turn a continuation application of Ser. No. 07/499,644, filed Mar. 27, 1990, now U.S. Pat. No. 5,155,974; which is in turn a continuation application of application of Ser. No. 07/328,074 filed Feb. 23, 1989, now abandoned; which is in turn the National Stage of PCT/AU87/00297, filed Aug. 28, 1987.

FIELD OF THE INVENTION

This invention relates to improved packaging and relates particularly but not exclusively to improved packaging where the goods therein such as fresh meats and/or other like goods are contacted by a skin and which contains a gas to enhance the keeping properties of the goods packaged therein.

DESCRIPTION OF THE PRIOR ART

Skin wrapping/packaging is a technique where goods such as meat can be packaged and where substantially all of the air and/or gases which surround the meat or other goods is evacuated.

Figures 1, 2:
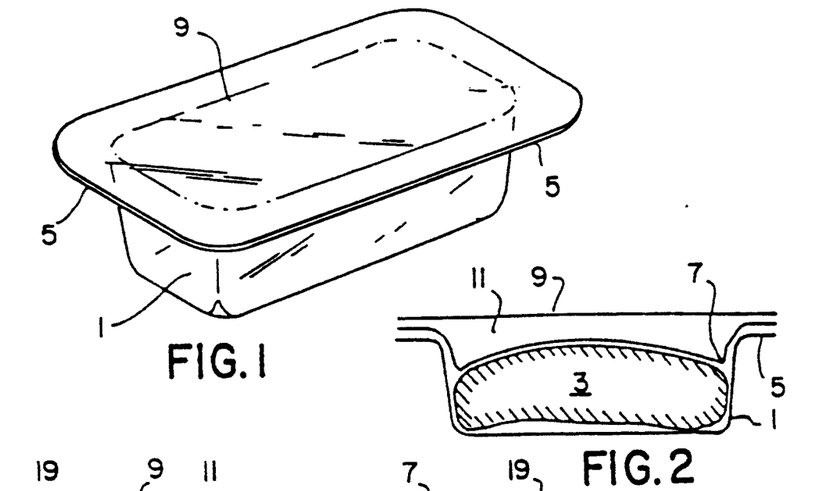
FIG. 1 is a top perspective view of one known plastics material packaging.
FIG. 2 is a cross-sectional view taken vertically through the packaging shown in FIG. 1.

FIGS. 1 and 2 show a form of plastics material packaging which has been proposed hitherto and which is generally disclosed in applicant's earlier application Ser. No. 086,046, now U.S. Pat. No. 4,840,271 PCT/AU86/00339. In this packaging there is provided a plastics material base 1 with goods 3 such as fresh meat, fish, poultry and/or vegetables packaged therein. The base 1 has a peripheral lip 5 and the upper surface of the goods 3 is shown lower than the lip 5. A skin wrapping plastics material 7 is fitted over the goods 3 and is bonded to the peripheral lip 5 as by welding or the like bonding techniques. The skin wrapping 7 extends downwardly from the lip 5 and closely surrounds the upper surface of the goods 3 so that substantially all air and/or gases are excluded from the space between the base 1 and the skin 7. A plastics material lid 9 is provided over the skin 7 and is bonded to the base 1 around the peripheral lip 5. A space 11 is provided between the lid 9 and the skin 7. The space 11 can contain a gas which will assist the keeping of the packaged goods 3. In this connection the gas can be either, or a combination of gas such as $O_2$, $N_2$, $CO_2$ which can enhance the colour and keeping qualities of the packaged goods 3 such as red meats.

The plastics material for the base 1, the skin 7 can be clear plastics materials. Typically the base 1 is PVC, the skin 7 is a co-extruded plastic such as PE/EVA and the lid 9 is a plastics material such as PVC/PE. The base 1, the skin 7 and/or the lid 9 may be multi-layered webs where selective plastics materials are employed to enable suitable bonding as by heat bonding caused by, for example, a heat bank or by RF welding, and to enable selective exclusion and/or transmission of gases through the various webs and particularly skin web 7.

It has been found that a skin wrapping in a packaging of the type shown in FIGS. 1 and 2 is not totally desirable because the skin wrapping 7 is not continuously maintained in a positively held tension arrangement across the goods 3. Thus, the PE/EVA material, skin 7 can after a period of time, can be displaced somewhat from the goods 3. This problem is exacerbated by the fact that after a period of time gas permeates under the skin 7 so that a gas pressure differential above and below the skin 7 is equal. The movement of the goods 3 during shipping tends to make the skin 7 loose, and this detracts from the appearance of the package.

STATEMENT OF THE INVENTION

Accordingly, the present invention attempts to provide an improved packaging where the skin material is maintained under tension in contact with the goods at all times.

Therefore, according to a first broad aspect of the present invention there may be provided a plastics material packaging for meat or other like goods comprising, a base of plastics material, meat or other like goods on said base, a plastics material skin wrapping overlaying the meat or other like goods on said base, said skin being bonded to said base around the periphery of said base, and a lid of plastics material fitted over said skin and bonded relative to said base around the periphery of said base, there being a space between said lid and said skin, a gas in said space which will enhance the keeping qualities of the packaged goods, said meat or other like goods being retained in compression under said skin by said skin bearing thereon, whereby to cause a tension to be applied to said skin to maintain said skin and said meat or other like goods in close skin wrapping relation.

In accordance with a further broad aspect of the present invention there may be provided a method for producing a packaging of the above type comprising,
providing a plastics material base,
providing meat or other like goods on said base,
providing a plastics material skin wrapping over said meat or other like goods,
compressing the meat or other like goods by causing the skin to overlay said meat or other like goods,
then bonding said skin to said base around the periphery of said base while maintaining the compression relationship,
placing a lid of plastics material over said skin and bonding it relative to said base, there being a space between said lid and said skin and a gas in said space which enhances the keeping qualities of the packaged goods,
said skin being maintained under tension by the bonding and by the outwardly directed forces applied thereto consequent on the compression of said meat or other like goods by said skin.

Most preferably the method also includes the step of applying inwardly directed forces to the meat or other like goods at the region where the bonding is to be effected between the skin and the base, said inwardly directed forces moving the meat or other like goods away from the surfaces where the bonding is to occur. Most preferably these inwardly directed forces are applied by means which engage with the outermost surface of the skin relative to said meat or other like goods and apply forces inwardly across the package.

According to a further broad aspect of the present invention there may be provided a heated platen for a skin wrapping apparatus for packaging goods to enable subsequent skin wrapping and bonding of the skin wrapping material to a base member in which goods are skin packaged, said platen comprising a first section defining an area where bonding of skin wrapping material is to occur and a second section where skin wrapping is to occur, said platen being movable towards said skin wrapping material to heat the same whereby the areas to be bonded are heated to a bonding temperature, and where the areas to be skin wrapped are heated to a skin wrapping temperature, so that heat bonding and skin wrapping can occur; said areas of said platen being individually heatable, and thermostatic control means associated with each section whereby selected temperatures of the areas can be controlled.

BRIEF DESCRIPTION OF THE DRAWINGS

In order that the invention can be more clearly ascertained reference will now be made to the accompanying drawings wherein.

DESCRIPTION OF PREFERRED EMBODIMENTS

Figure 3:
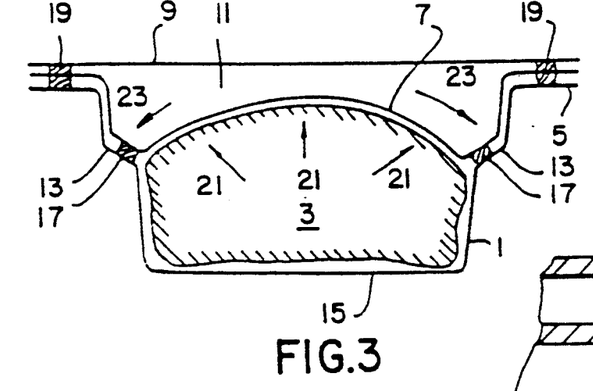
FIG. 3 is a view similar to that of FIG. 2 but showing one preferred embodiment of the improved packaging according to the present invention.

Referring now to FIG. 3, there is shown a packaging which will have the same designations as the packaging shown in FIGS. 1 and 2. In the embodiment shown in FIG. 3 the base 1 has a second lip 13 which is displaced downwardly closer to the bottom 15 of the base 1 than the lip 5. Preferably the second lip 13 is inclined downwardly and inwardly as shown but it may be parallel with lip 5. A suitable angle of inclination is 45 degrees. The skin 7 is bonded to the second lip 13 at the innermost and lowermost surfaces thereof as shown by numeral 17. The bonding is preferably by a heat bonding which can be performed by using a heat bank type bonding member. The lid 9 is bonded completely around the perimeter of the base 5 by bonding at the region 19. This bonding also is to the skin 7 which overlays the lip 5.

Typically the base 1 is of PVC/PE, the skin 7 of a LLDPE material and the lid 9 is of PVC/PE. The base 1 can be 200–600 microns thick. The skin 7 can be 10–100 microns thick and the lid 9 50–100 microns thick. The goods 3 are compressed by the skin 7 being applied thereto under tension so that they produce outwardly directed forces 21 to the skin 7 and these forces 21 in turn provide for substantially continuously applied tension forces 23 to be retained in the skin 7. The tension forces may change slightly after a period of time, but the relationship is such that there will be a substantially, continuously applied tension in the skin 7. The tension forces, in effect stretch the skin 7 over the goods 3. A vacuum or lower than atmosphere pressure is provided under the skin and this to some degree assists in maintaining the skin 7 in contact with the upper surface of the goods 3. The space 11 under the lid 9 and above the skin 7 can contain a gas for enhancing the keeping qualities of the packaged goods 3. Typically the gas can be $O_2$, $N_2$ or $CO_2$ or any combination thereof. Other gases or combinations thereof can be employed if desired.

Figure 4:
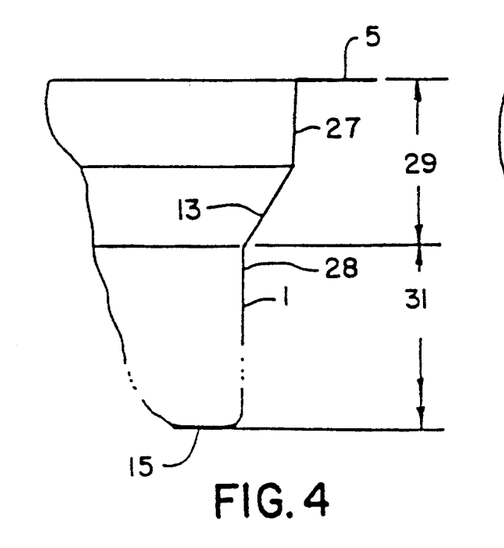
FIG. 4 is a detailed close up view of a side edge of the base shown in FIG. 3.

Referring now to FIG. 4 there is shown a close-up detail of the lip region of the packing shown in FIG. 3. It can be seen that lip 5 is generally horizontally extending and parallel with the bottom 15 of the base 1. It is also seen that the lip 13 is inclined relative to the bottom 15. The angle of inclination at about 45°. The upper side wall 27 between lip 13 and lip 5 is directed inwardly towards the bottom 15 of the base 1. Similarly the lower side wall 28 below the lip 13 is directed inwardly towards the bottom. In one particular embodiment, it is proposed that the depth of the packaging below lip 13 be changeable at the time of making the base 1 to compensate for different thicknesses of goods 3 which are to be packaged within the packaging. Accordingly, depth 29 will be arranged to be fixed while depth 31 can be arranged to be variable. The requirement is to provide a base 1 where the upper surface of the goods 3 will be in the region between the bottom of lip 13 and lip 5, i.e. within depth 29. In this way when the skin 7 is welded to the bottom of the lip 13 as at bond 17, the necessary compressive forces will be applied to the goods 3 and thus the tension and stretch forces 23 will be produced in the skin 7.

Figure 5:
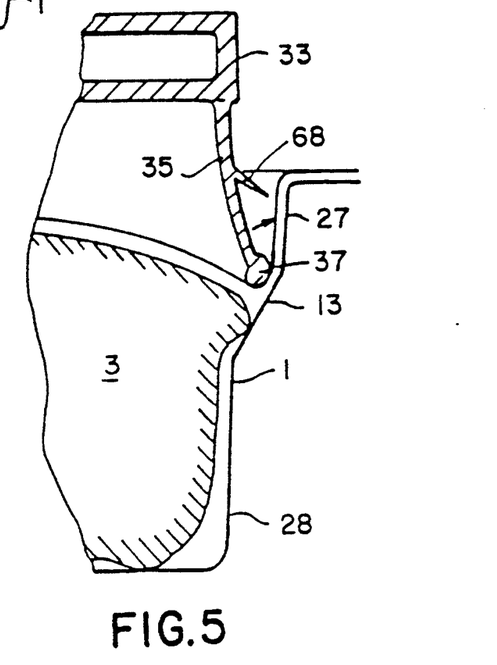
FIG. 5 is a view similar to that of FIG. 4 showing how a skin is placed under tension in accordance with an embodiment of the present invention.

Referring now to FIG. 5 there is shown a detail of how the skin 7 is moved during the method of producing the packaging. In this embodiment the goods 3 are loaded into the base 1 so that the upper surface of the goods 3 is in the region between the bottom of the lip 13 and the lip 5. The skin plastics material 7 is then placed over the opening in the top of the base 1 and held thereto by holding means not shown. Air pressure is reduced in a chamber (not shown in FIG. 5) which surrounds the base 1. A platen 33 with outwardly biased resilient pushing members 35 is depressed into the top of the base 1 stretching the skin 7 downwardly into the base 1. If the opening at the top of the base 1 is rectangular there will be four such pushing members 35—one for each side. The pushing members 35 have a roll lowermost end 37. Thus, when the platen 33 is lowered onto the clamped skin 7 which is flexible and stretchable, the skin moves downwardly down the upper side wall 27 by the roll lowermost end 37 engaging therewith. The roll lowermost end 37 then locates at the top of the lip 13, and as it moves downwardly thereover, there is provided inwardly directed forces to that portion of the side edges of the goods 3 which is above the bottom of the lip 13. Thus, the goods 3 are pushed inwardly relative to the lower side wall 28. As the platen 33 is lowered the resilient pushing members 35 move inwardly by their sliding action down the upper side wall 27 and the second lip 13. The skin 7 can ten be bonded to the lowermost region of the lip 13 by a heated die member which can be inserted downwardly into the base 1 between the pushing members 35 and the side wall 27. This will be explained in due course. Thus, there will be a lower than atmospheric pressure of air sealed under the skin 7.

Figure 6:
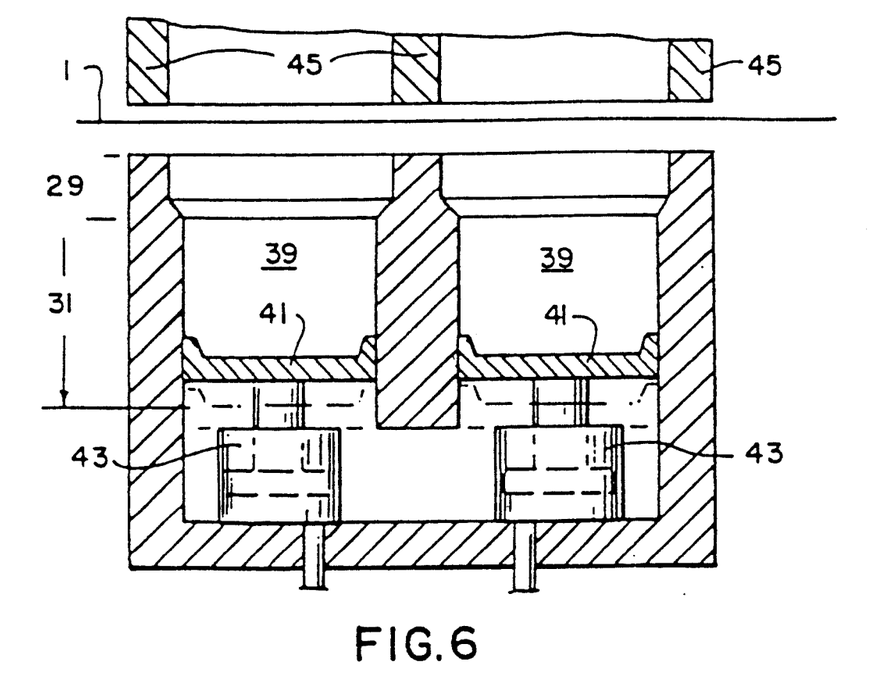
FIG. 6 is a cross-sectional view of a base forming station used during part of a preferred method.

Referring now to FIG. 6 there is shown an apparatus used for producing pairs of bases 1. Here a web of plastics material 1 is provided over a pair of female die cavities 39. The plastics material 1 may be PVC or alternatively PVC/PE or of other like materials. Typically it can be in the order of 400 micron thickness. Thus it will produce relatively rigid base 1 structures. The female die cavities 39 have an upper configuration to form lip 5, upper side wall 27, second lip 13, and lower side wall 28. The distance 29 is a fixed distance while distance 31 is a variable distance to allow for producing bases 1 with desired depths to suit different height size goods 3. The distance 31 can be adjusted by raising and/or lowering bottom sections 41 of the female die cavities 39. As shown in FIG. 6 this may conveniently be performed by means of hydraulic rams 43. In use, the web 1 is heated to a thermo forming temperature and is clamped above the female die cavities 39 by means of clamps 45. A vacuum is then provided underneath the cavities 39 to cause it to vacuum form to the shape of the female die cavities 39.

Figure 7:
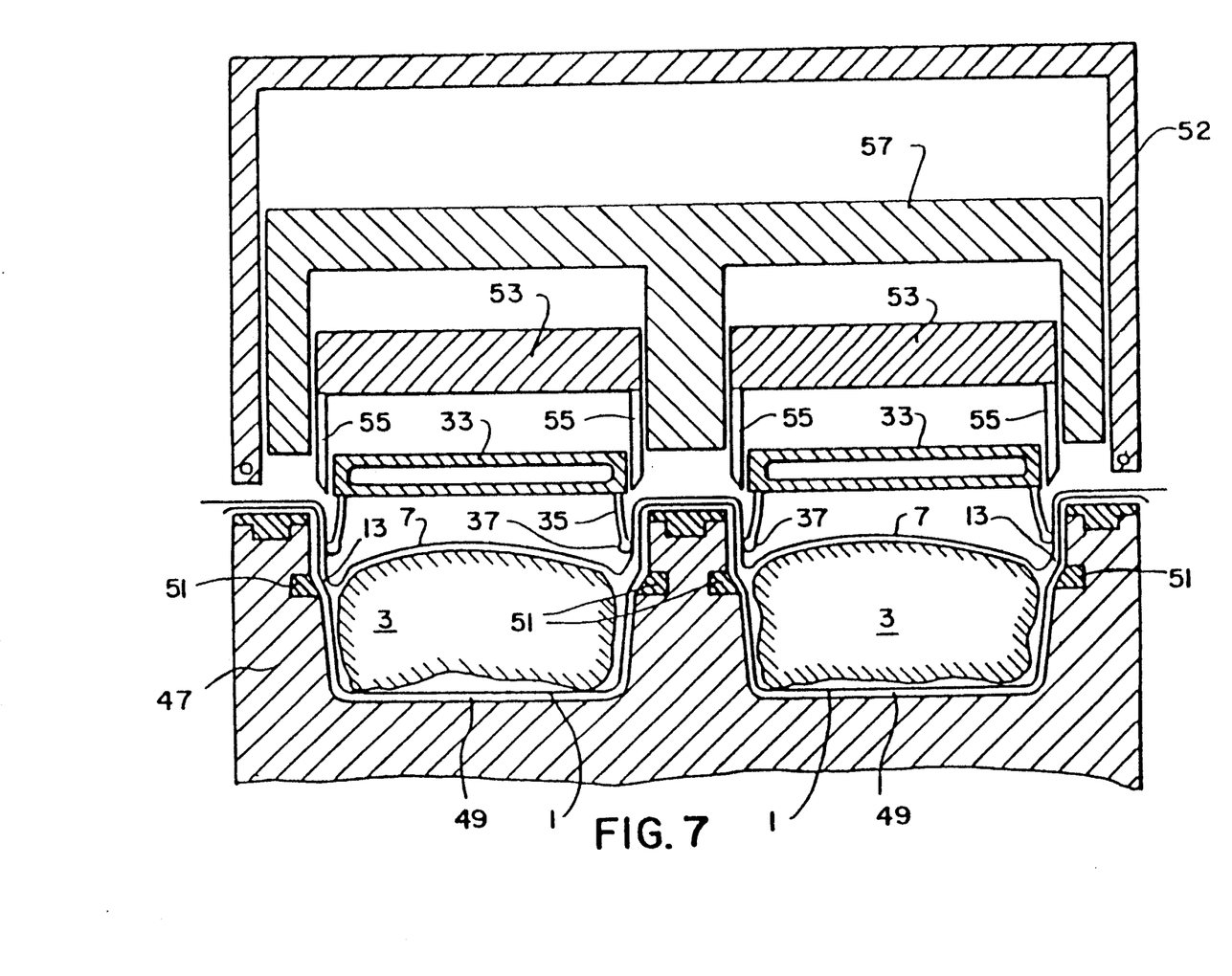
FIG. 7 is a cross-sectional view of a skin wrapping station used in a preferred method.

Referring now to FIG. 7 it can be seen that the preformed bases 1, produced in the thermo forming station shown in FIG. 6, are introduced into what we call a skin wrapping station. The skin wrapping station comprises a lower section 47 which is shaped with cavities 49 in which the bases 1 are received. The cavities 49 are shaped to closely follow the upper portion of the bases at least above the bottom of the lips 13. In this connection the lower section 47 includes rubber sealing and pressure anvil surfaces 51. The skin wrapping station is covered by a movable upper chamber part 52 which can be moved up and down to seal relative to the lower chamber 47. The air pressure within the skin wrapping station is then reduced below atmospheric pressure, and the platens 33 are then lowered which causes the skin material 7 which may be LLDPE to apply a compressive force to the top of the goods 3 within the package and thus a tension force to be applied to the skin 7 as described in relation to FIG. 5 and FIG. 3. The skin material 7 will stretch during this procedure. A heated heat bank 53 with downwardly extending skirts 55 is then lowered. The lowermost end of the skirts 55 are inclined at the same angle as the angle of the lips 13. Thus, when the heat banks 53 are lowered the skirts 55 will cause a bonding of the skin 7 to the base 1 at the bottom of the second lip 13. Following bonding by the skirts 55 then a further heat bank 57 can be lowered to effect a bonding of the skin material 7 to the lip 5 of the base 1 if desired.

In the above described embodiment, the platen 33 and the pushing members 35 carried thereby are cooled as by water flowing through a hollow interior of the platen 33 so as to enable the pushing members 35 and the roll lowermost ends 37 thereof to not effect bonding of skin material 7 to the base 1 as it is lowered thereinto.

The goods in the bases 1 can then be taken to a further station (not shown) where lids 9 as PVC/PE can be bonded thereto and where suitable gases can be provided within the space 11 between the lid 9 and the skin 7. A typical example of how the lids 9 and suitable gases can be provided is disclosed in PCT Patent specification no. PCT/AU84/00131 assigned to Garwood Limited. This is now regarded as common knowledge. The details of that method are imported into the present patent specification.

Figure 8:
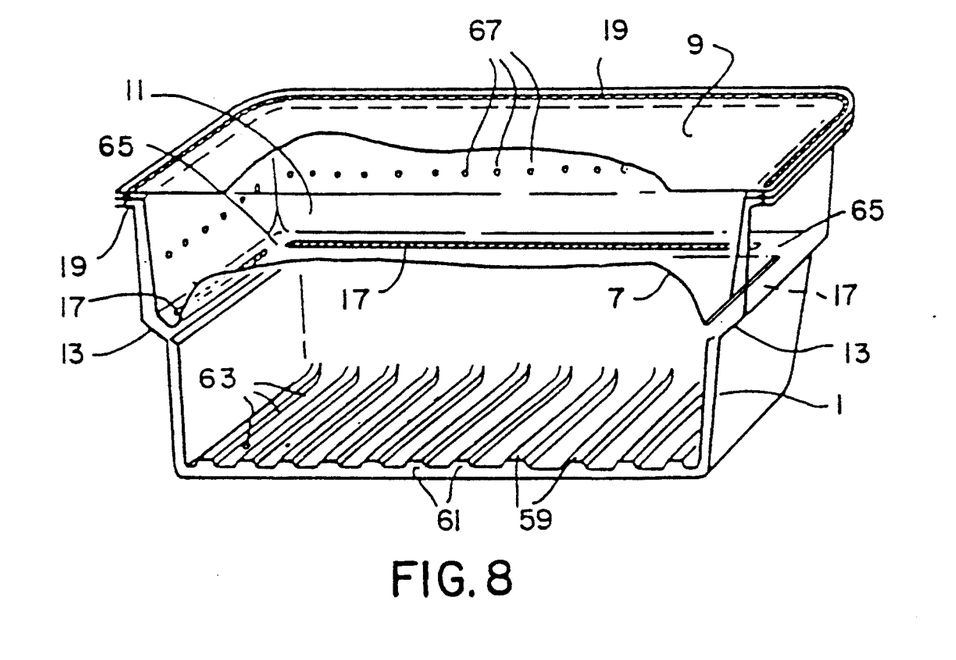
FIG. 8 is a vertical cross-sectional view of a different embodiment of the present invention.

Referring now to FIG. 8 there is shown a packaging similar to that shown in FIG. 1 but here the packaging is provided with an optional liner tray 59 which has a corrugated bottom 61. The corrugations in the corrugated bottom 61 space the meat or other goods 3 upwardly a small distance from the bottom of the base 1. The lowermost corrugations have a number of openings 63 therein, only some of which have been shown in FIG. 8 in order to aid clarity. The liner tray 59 is preferably of a clear plastics material such as of PVC. The openings 63 provide air passageway means for (a) enabling easy nested insertion of the liner tray 59 in the base 1 and (b) to also allow liquids which may escape from the meat to settle underneath the liner tray 59 and should the packaging be inverted then any liquids will be inhibited from passing through the openings 63 as those openings will now be the crests rater than the troughs of the corrugations. The openings 63 also allow gas packaged within the package to circulate. This will be explained more fully in due course. The height of the liner tray 59 is arranged to be just below the second lip 13. It will be noted that the packaging has a bond 19 around the peripheral lip 5 and that it has four bonds 17—one along each of the respective sides of the packaging on the second lip 13. It can be seen in FIG. 8 that the bonds 17 along each side do not meet and that there is provided an unbonded section 65 in each corner of the packaging. Gases are permitted to flow from under the skin 7 into the space 11 and vice versa by passing through the unbonded sections 65. In order to facilitate the gases passing from space 11 through the unbonded sections 65 there are provided a plurality of apertures 67 in that portion of the skin 7 which extends from the bond 17 to the bond 19. The apertures 67 may be provided by finger like rods 68 (see FIG. 5) which extend from the outermost faces of the pushing members 35 and pierce the skin material as the pushing members 35 are lowered. The rods 68 are swingable towards the outer face of the pushing members 35 as the heated skirts 55 of the heat bank 53 are lowered. This occurs when the skirts 55 engage with the rods 68 during the movement of the skirts 55 to effect bonding of the skin 5 to the lower lip 13.

The lid 9 may be of a PVC/PE material of about 100 micron thickness.

Figure 9:
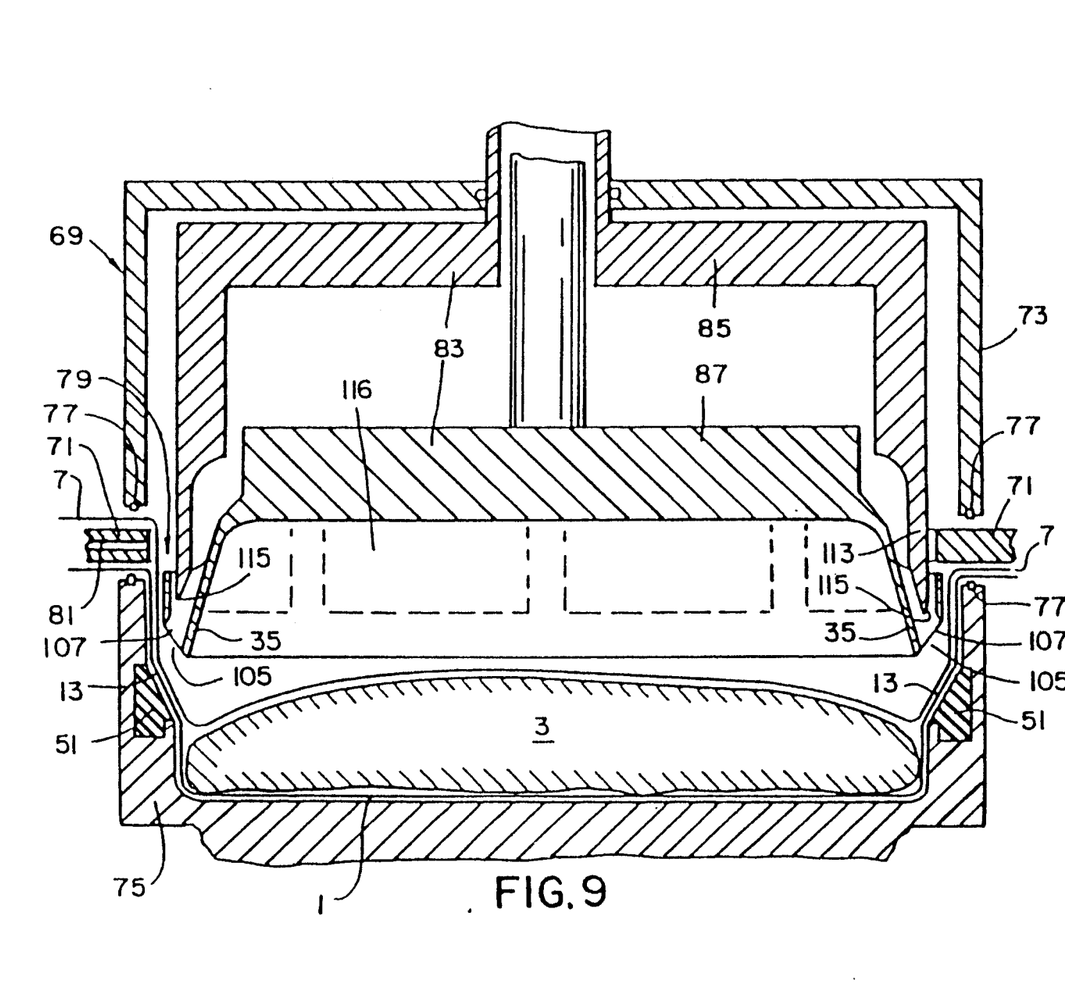
FIG. 9 is a vertical cross-sectional view of skin wrapping station used in another embodiment.

Referring now to FIG. 9 there is shown a cross-sectional side view of a skin wrapping station 69 of a different embodiment. In the view shown in FIG. 9, goods 3 have been provided in the preformed base 1 which is typically formed integral in a web of plastics material together with others of the bases 1. In other words there is a length of plastics material with preformed bases 1 therein. The bases 1 may be formed by thermoforming as in the previous embodiment. In FIG. 9 there is shown a gas injection plate means 71 of the same type in the aforementioned PCT Patent Specification No. PCT/AU84/00131. As previously mentioned the disclosure in that patent specification is imported herein. It can be seen that the skin wrapping station 69 includes an upper chamber part 73 and a lower chamber part 75. Each of the upper chamber part 73 and lower chamber part 75 has seal means 77 so that when the upper chamber part 73 and the lower chamber 75 are brought together, they will engage with the respective opposed surfaces of the plate means 71 and provide a gas type seal within the upper chamber part 73 and the lower chamber part 75. In this connection the gas injection plate means 71 (hereinafter referred to as plate means 71) has a central opening 79 which corresponds to the shape of the perimeter of the base 1. This is clearly disclosed in the aforementioned PCT Patent Specification No. PCT/AU84/00131. The skin material 7 passes from the upper surface of the plate means 71—see the left hand side of FIG. 9—diagonally through the opening 79 to the undersurface of the plate means—see the right hand side of FIG. 9. The plate means 71 contains gas passageway means 81 which communicate with the opening 79. Thus, when the upper chamber part 73 and the lower chamber part 75 are closed about the central opening 79, and after the air pressure is reduced below that of atmospheric pressure, a gas such as $O_2$, $N_2$ or $CO_2$ or mixtures thereof can be emitted from the gas passageway means 81. The pressure of the gas in the packaging can be less than atmospheric when the skin 7 is bonded to the base 1.

It is observed in FIG. 9 that the meats or goods 3 extend to a height above the lower edge surface of the second lip 13.

In use, when the base 1 is located in the desired skin wrapping station 69 the lower chamber part 75 can be closed on the undersurface of the plate means 71 and similarly the upper chamber part 73 can be closed on the upper surface of the plate means 71. The air pressure can be reduced and the gas can then be passed through the gas passageway means 81 while a part of platen 83 can simultaneously be lowered. The platen 83 is a two part platen comprising an upper heated part 85 and a lower cooled part 87 which can be independently moved. The necessary connections for heating and for cooling of the heated part 85 and the cooled part 87 of the platen 83 have not bee shown in order to aid clarity. The platen 83 can be moved upwardly and downwardly within the upper chamber part 73. The cooled part 87 carries pushing members 35.

Figure 11:
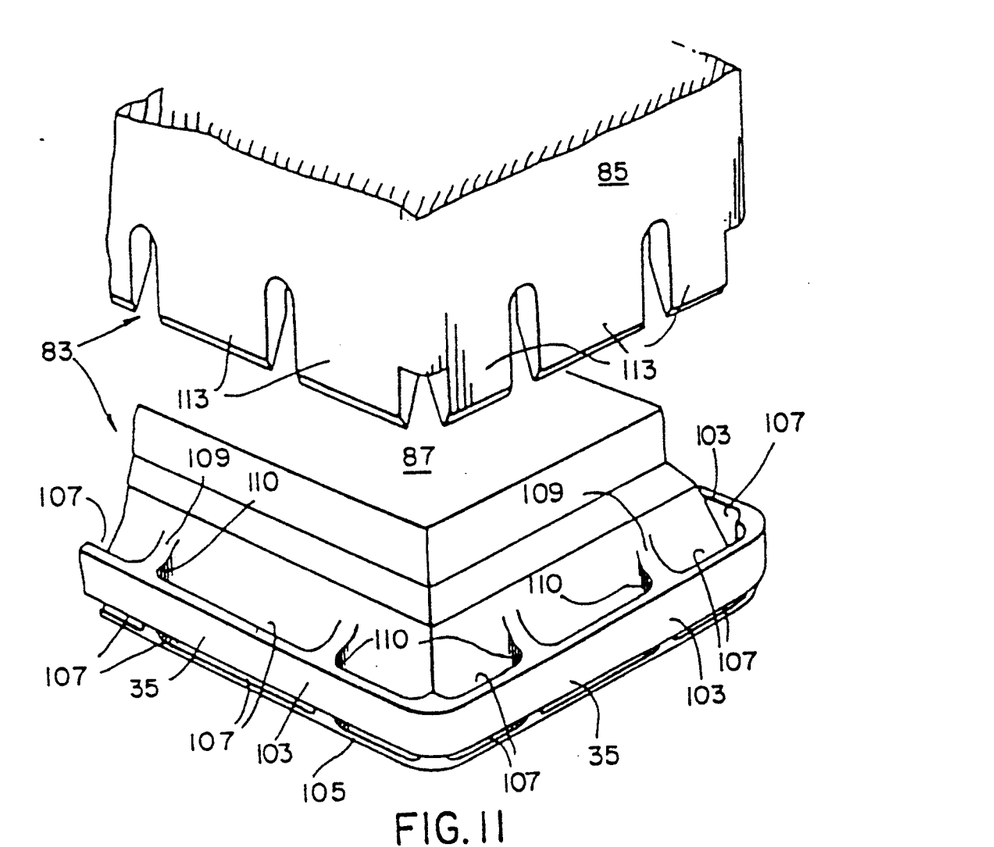
FIG. 11 is a top perspective view of parts of the skin wrapping station shown in FIGS. 9 and 10, but of one corner only and where the parts are moved apart.

The detail of the platen 83 is clearly shown in FIG. 11. It can be seen that platen 83 is in two parts—upper heated part 85 and lower cooled part 87. The pushing members 35 comprise a single peripheral skirt 103 around the lower extremity of lower cooled part 87 with a pushing face 105 inclined at the same angle as the angle of inclination of second lip 13. A series of openings 107 are provided in the peripheral skirt 87 which pass from a top surface 109 thereof to the pushing face 105. Webs 110 remain between the openings 107 to hold the peripheral skirt relative to the lower cooled part 87. The arrangement is such that the pushing face 105 is cooled. The upper heated part 85 has a series of welding fingers 113 extending therefrom and in aligned relationship to the openings 107. In use, the fingers 113 are heated from the upper heated part 87 and pass downwardly through the openings 107 to effect welding of the skin material when the upper part 85 is lowered. The ends 115 of the lower face of the fingers 35 are inclined at the same angle as the angle of inclination of the lower lip 13. Thus, when the lower face of the fingers engages with the skin 7 as they pass through the openings 107, they apply pressure thereto against anvil surfaces 51, and there will be welding bonding of the skin 7 to the lower lip 13 over the length and width of the fingers 35. This, in turn, will produce the bonds 17 shown in FIG. 8 but this time in spaced apart relation with unbonded spaces 117 (see FIG. 12).

The arrangement is such that when the lower or cooled part 87 is lowered first the pushing member 35 engages with the skin material and push and stretch it down to the lower lip 13 where it is held. The inclined nature of the inside surfaces of the pushing members 35 also causes the goods 3 to be displaced inwardly and off the lower lip 13 if the goods 3 should extend over onto the lower lip 13. The skin 7 is thus under tension as the goods 3 are compressed slightly, following this procedure. The upper heated part 85 is then lowered so the fingers 113 pass through the apertures and weld bond the skin 7 to the lower lip 13, retaining the tension in the skin 7 when the pushing member 35 and the fingers 113 are removed.

Because the atmospheric air has been exhausted from the closed chamber defined by the upper chamber part 73 and the lower chamber part 75 and replaced with a desired gas at a pressure slightly lower than atmospheric pressure, the skin 7 will be caused to be held to the base 1 and skin pack the goods 3.

Figure 10:
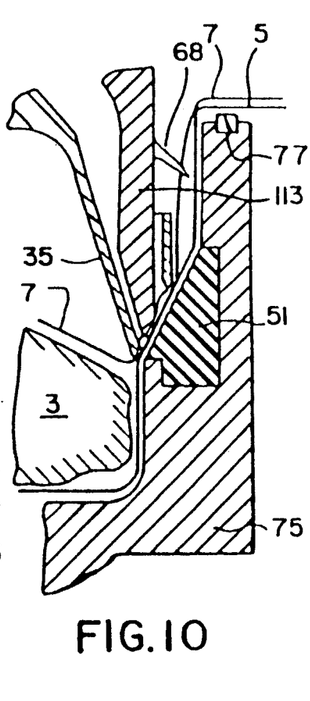
FIG. 10 is a close-up view similar to FIG. 9 but showing one side edge only of the skin wrapping station and at a different stage of operation than shown in FIG. 9.

FIG. 10 shows a close-up detail of the pushing member 35 and the fingers 113 contacting the skin 7 at the lower lip 13.

It should be noted, that in order to assist the skin 7 from moving and stretching onto the goods 3, that the gas which is passed through passageway 81 can be used to inflate the skin 7 relative to the base 1 so as to cause the skin 7 to move upwardly into the cavity 116 of the lower cooled part 87 or the corresponding cavity in any of the previous embodiments. For this purpose the lowermost surfaces of the cooled part 87 can be positioned to align with the height level of the undersurface of the plate 71 until it is required to cause the skin 7 to engage with the surface of the goods 3. The skin 7 may be heated to a suitable deforming temperature to assist application of the skin prior to it entering the skin wrapping station. The cavity 116 can therefore be suitably shaped for this purpose. The pressure of inflation can be to about 10% of atmospheric air pressure such as 0.1 BAR.

Atmospheric air pressure can then be admitted above the skin 7 and into the cavity 116, causing the skin 7 to invert. The lower or cooled part 35 can then be lowered to effect weld bonding to the lower lip 13. The tension and stretch forces applied to the skin 7 will then be similar to those as applied previously, but the inversion process assists the skin 7 assuming the required position.

If required apertures 67 can be punched through the skin 7 between the lower lip 13 and the lip 5. Fingers 68 (see FIG. 10) on the lower cooled part 87 provide such punching in that part of the skin 7 which is held taught between the lower lip 13 and the upper lip 5 and which does not directly contact the side walls of the base 1 between those positions. The bases 1 are then advanced to a lid sealing station of the type disclosed in PCT patent application PCT/AU84/00131 referred to previously where a lid 9 can be provided and a desired gas provided in the space 11 under the lid 9 and above the skin 7.

The packaging can then advance to a guillotine where the packaging can be separated from the web of material in which all the bases 1 are provided.

Figure 12:
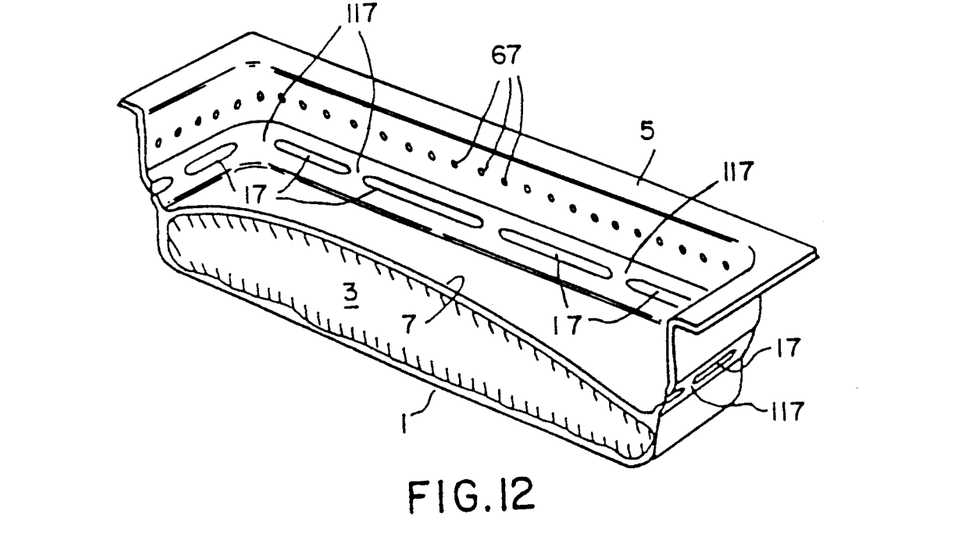
FIG. 12 is a top perspective vertical cross-sectional view of packaging produced by the skin wrapping section of FIGS. 9, 10 and 11.
Figure 13:
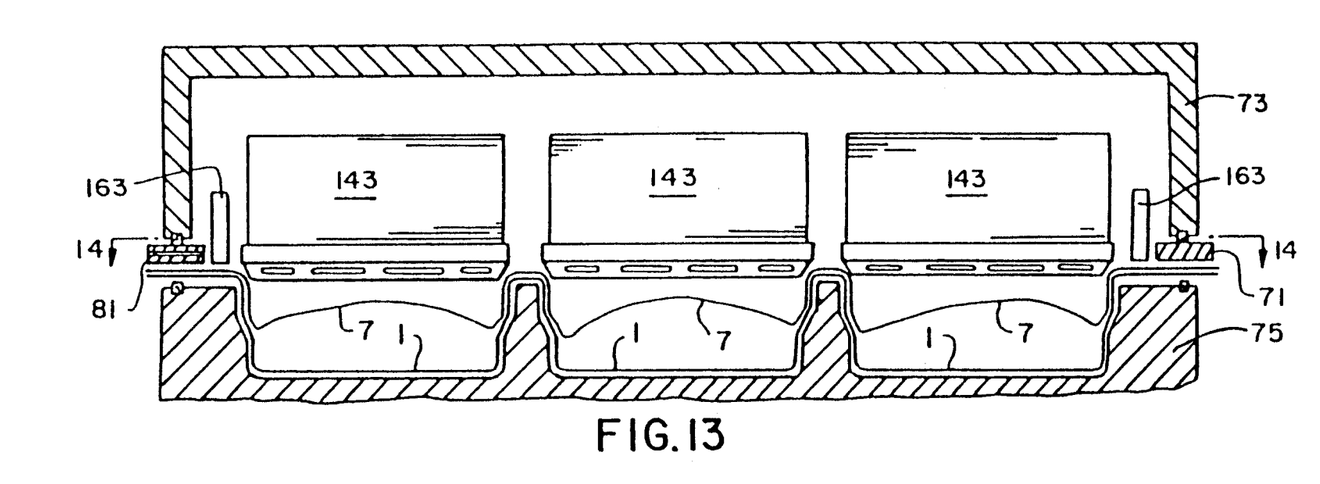
FIG. 13 is a transverse cross-sectional view across the skin wrapping station shown in FIG. 9 showing how three different packages are produced simultaneously.
Figure 14:
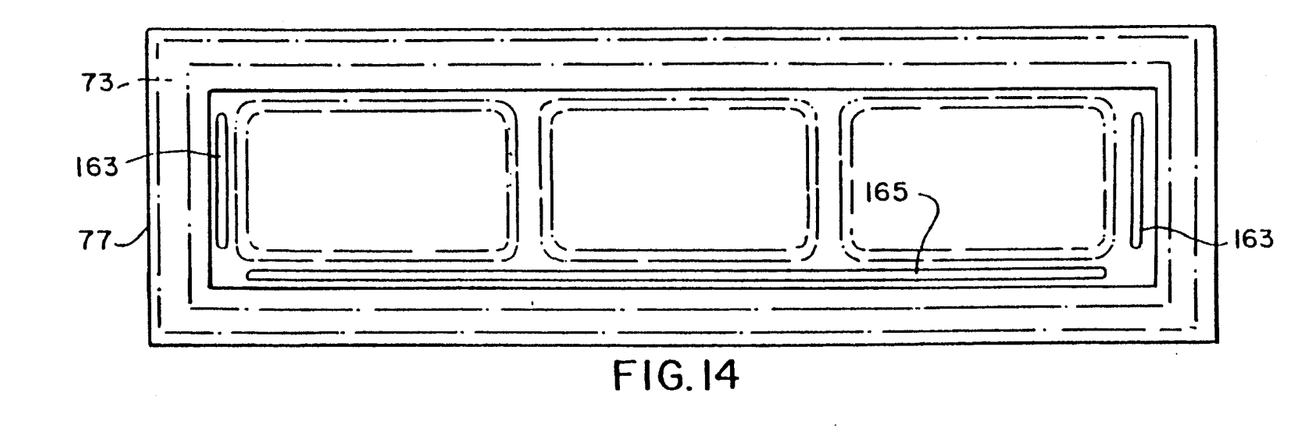
FIG. 14 is a cross-section plan view of the skin wrapping station shown in FIG. 13 taken along line 14—14.

In the embodiments of FIGS. 9 through 12 there is disclosed a skin wrapping station where there is provided a cooled platen 87 and a heated platen 85. In this embodiment there is provided a plate means 71 so that a suitable gas can be inserted underneath the skin material 7. In this connection it should be observed that FIG. 9 represents a central one of three packages in the skin wrapping station. FIGS. 13 and 14 show that three packages are produced simultaneously at the skin wrapping station. Means for effecting movement of the cooled platen 87 and the heated platen 85 have not been shown but conveniently these may comprise air bag movement means. As can be seen in FIG. 12, the packaging has the upper lip 5 and the lower lip 13 of the previous packaging. The skin material 7 is bonded to the lower lip 13. The lid 9 retains desired gas above the skin 7. That gas can now freely circulate to contact the surface of the goods 3 by passing through apertures 67 and then through spaces 117. It may also pass directly through the skin material 7. Thus the whole of the free volume within the packages contain a desired gas to enhance the keeping qualities of the goods, such as red meats. The fact that the skin 7 is wrapped to the goods 3 with a desired gas under the skin 7 means that there is unlikely to be any undesirable gas packaged.

Further, because of the passageways 117 between the adjacent bonds 17 and the holes punched through skin 7, the pressure of the atmosphere above the skin 7 prior to sealing of the lid 9, will cause it to displace onto the goods 3 and thus any excess gas from over inflation under the skin 7 an be displaced. Accordingly, skin 7 can be made to firmly engage with the upper surface of the goods 3.

Referring now to FIGS. 13 and 14 it can be seen that the skin wrapping station is sealed by an upper chamber part 73 as in previous embodiments. The space under the upper chamber part 73 can be filled with a suitable gas such as O$_2$, N$_2$ or CO$_2$ or mixtures thereof after evacuation of the air pressure so that the environment of the skin wrapping station contains a desired gas. The heated part 85 and the cooled part 87 are shown together as blocks 143. Heated bars 163 are provided down each side of the skin wrapping station. In use, the heated bars are lowered prior to movement of the parts 85/87 so as to heat weld the skin material 7 (not shown in FIGS. 13 and 14) to the side edges of the material from which the bases 1 are made. A further heated bar 165 is also provided and this is lowered to effect heat bonding transverse to the web 1 from which the bases 1 are made prior to opening of the upper cavity 73 and the lower cavity 75, after the skin wrap material 7 has been suitably bonded to the lips 13. The bars 163 and 165 bond the skin material 7 to the web of material from which the bases 1 are formed and thus physically hold the skin material in a generally planar stretched condition across the bases 1. When the upper cavity 73 is closed relative to the lower cavity 75 then the skin material 7 is held on the upstream side of the skin wrap station by the closing of the upper cavity 73 onto the plate means 71. The downstream side of the skin material is then held to the bond created by the heating bar 165 from the previous bonding operation of the bases 1 which are then downstream of the skin wrapping station.

Thus with the embodiments shown in FIGS. 9 through 14 it can be appreciated that when a lid 9 is provided to the packaging and a gas of a desired type maintained under the lid 9, that the gas can circulate through the openings punched by the fingers 68 and then through the spaces 117 between the adjacent welds 17 formed by the bonding surfaces 115 of fingers 113 to be under the skin material 7. Thus, the goods 3 can be held firmly within the package and yet be subject to a desired gas which can be selected to enhance the keeping and/or colour retaining properties of the packaged goods such as red meat.

Typically the plastics materials used for the packaging can be the same as in any of the previous embodiments.

It desired the bars 163/165 may provide continuous welds around the perimeter of the skin wrapping station so there will be no spaces between the welds of the bars.

Figure 15:
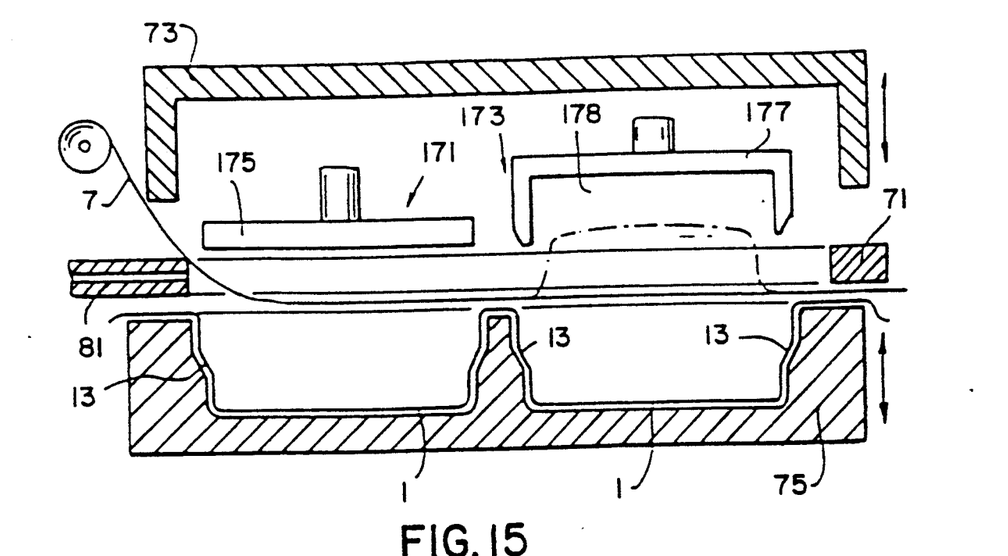
FIG. 15 is a side cross-sectional view of a double station skin wrapping station of a different embodiment.

Referring now to FIG. 15 here is shown a different embodiment of a skin wrapping station which includes two stations therein. There comprises a first station 171 and a second station 173. The skin wrapping station can conveniently include a gas discharging plate 71 of the type previously described and in particular of a type similar to that disclosed in PCT Patent Specification PCT/AU84/00131. As bases 1 index into the skin wrapping station they first index into the first station 171 therein. The upper chamber part 73 closes onto the plate means 71 and the lower chamber part 75 also closes onto the plate means 71. Air is evacuated. A desired gas is introduced at a pressure slightly less than atmospheric, say 10% atmospheric. At the first station 171 there is provided a heated platen 175 which is heated to a temperature such as 90° C. for heating the web of skin material 7 to a desired temperature. The platen 175 is lowered towards the skin material 7 to effect his required heating. The desired gas can then be expelled through the opening 81 in the plate means 71 at a pressure say 10% of atmospheric such as 0.1 BAR. Air can then be allowed into the upper chamber or alternatively a gas such as the same gas which is provided under the web 7 but at a higher pressure, can be admitted into the upper chamber 73 causing the web 7 to move into the base 1 and over goods 3 which maybe therein. When the gas is admitted, it will cause the already heated web 7, from platen 175, to be displaced upwardly without bonding or sticking into cavity 178 of a further heated platen 177. The lower chamber can then be lowered, allowing the base 1 to index into the second station 173. Air or gas can then be introduced into the upper chamber 73 causing that displaced portion of web 7 to invert and wrap the goods 3 to the base 1. The further heated platen 177 can be lowered to effect bonding of the skin material 7 to the lower lips 13 of the bases 1. It should be appreciated that while bases 1 are being processed in the second station a further base 1 is being processed in the first station. The temperature of the heated platen 177 may conveniently be 115° C. which will be sufficient to provide for suitable bonding by welding of the skin material 7 to the lower lips 13. Thus, it can be appreciated with the embodiments shown in FIG. 15, differentials in temperature can be provided for (a) wrapping and (b) subsequent bonding or welding. The heated platen 177 may be arranged to provide a completely continuous weld around the lip 13 or to provide a completely continuous weld around the lip 13 or to provide a series of spaced apart welds as in the embodiments previously disclosed.

Figure 16:
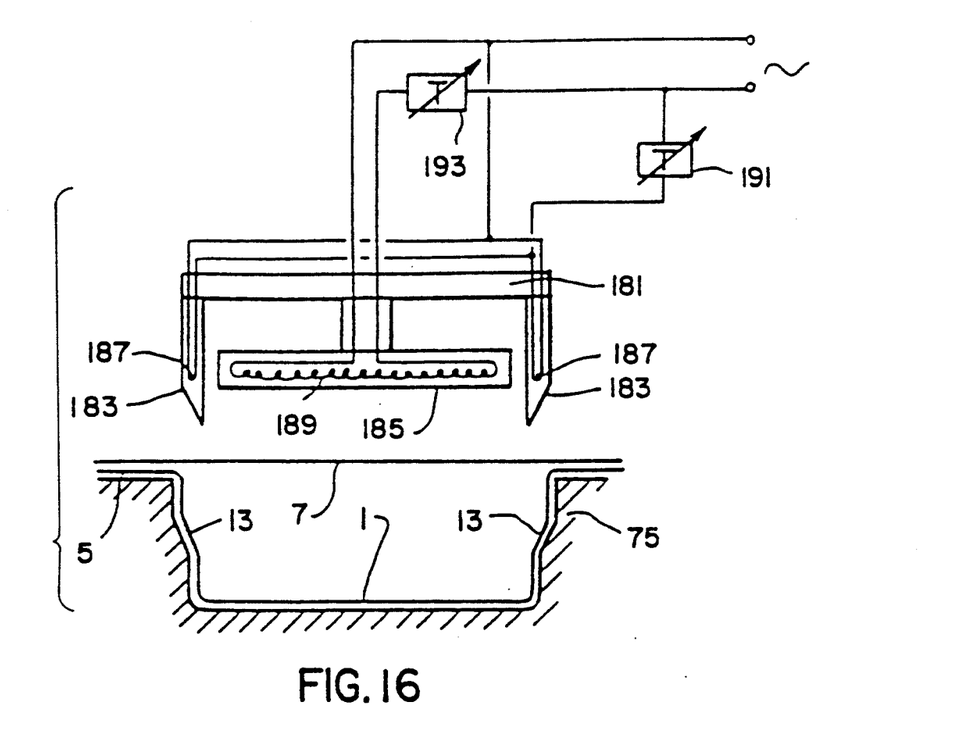
FIG. 16 is a side view in part schematic form showing a heated platen of a different embodiment.

Referring now to FIG. 16 there is disclosed a completely different type of platen which can be used to effect both heating to a wrapping temperature and heating to a bonding temperature. In this embodiment there is comprised a platen base 181. Attached to the base 181 is a continuous or an interrupted first platen area 183, and also a second platen area 185. The first platen area 183 can be continuous so that when heated to require temperatures it can effect a continuous bond as by heat welding. Accordingly, the first platen area 183 is heated to a suitable welding or bonding temperature. If desired, the first platen area 183 may be interrupted so as to provide a series of spaced apart bonds or welds with gas passageway means therein as disclosed in connection with the previous embodiments. The second platen area 185 provides heating to a wrapping temperature where the plastics web 7 can be heated to a desired wrapping temperature.

The first platen area 183 is heated by heating means which is independent of the heating means which heats the second platen area 185. Conveniently, the first platen area 183 is heated by electrical coils 187 and the second platen area is heated by electrical coils 189. The coils 187 are connected to a source of input energy such as an AC energy source and are controlled in temperature by a thermostat means 191. The electric coils 189 are similarly connected to a source of energy and are controlled by a thermostat means 193. Thus, with the platen shown in FIG. 18 it is possible to heat the skin material 7 to a desired temperature in selected areas for bonding as by heat welding and to simultaneously heat other areas to another selected temperature which may be suitable for wrapping.

It should be appreciated that the heating of the first platen area 183 and of the second platen area 185 may not necessarily be by electric heating means but by any other convenient heating means which is suitably thermostatically controlled.

The platen means disclosed in FIG. 16 can be used in other environments as for example in blow moulding arts where it may be desirable to heat plastics materials in selected areas to different temperatures to enhance the blow moulding of the plastics. The platen shown in FIG. 16 may be used to replace the platen referred to in any of the previous embodiments—the prime requirement here being to provide a bonding as by heat welding to the lower lip 13 and a subsequent wrapping of the web 7 over the goods 3.

Figure 17:
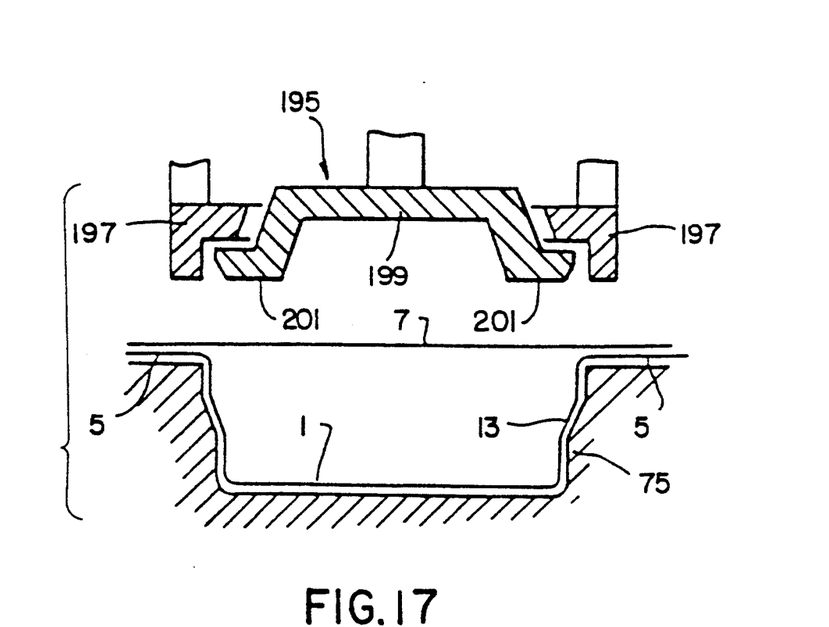
FIG. 17 is a side view of a different embodiment of the platen to that shown in FIG. 18.

Referring now to FIG. 17 there is shown a different type of platen which is in two parts which each may be independently moved relative to the other. Each of the platen parts is heated to suitable temperatures for heating areas of the plastics material which is to be heated thereby.

The platen comprises a central portion 195 and an outer peripheral portion 197. In use, both the central portion 195 and the peripheral portion 197 are brought down together to engage with or be in proximity to the upper surface of a web of skin material 7. The peripheral portion 197 is then lowered and pressure applied so that bonding occurs around the upper lip 5. It will of course be appreciated that air has been evacuated from the skin wrapping station and a desired gas introduced at a pressure lower than atmosphere under the web 7. Because the air pressure will be lower above the web 7 than below the web 7, the web 7 will displace upwardly towards the central portion 195 and be heated thereby. It will generally conform to the shape of the cavity 199 in the central portion 195. The central portion 195 can then be lowered so that the undermost surfaces 201 provide the bonding by heat welding of the skin material 7 to the lower lips 13. It may be desirable to apply greater pressure for the bonding of the web 7 to the upper lip 5 than to the lower lip 13. This may be required to ensure that there is an absolute gas tight seal around the upper lip 5 but whereas at the lower lip 13 it may not be necessary to provide for such a good and gas tight seal. Thus, because the peripheral portion 195 can be heated to a desired temperature and because the central portion 195 can be heated to a different desired temperature, there can be control of the temperature of the web of material which is to be bonded. This control of the temperature coupled with the independent control of pressure applied by the peripheral part 195 and the central part 195 can be used to enhance the packaging process. This type of platen can also be used in any of the embodiments previously described and in other arts where material may need to be selectively heated in areas to different temperatures such as in the blow moulding arts.

Figure 18:
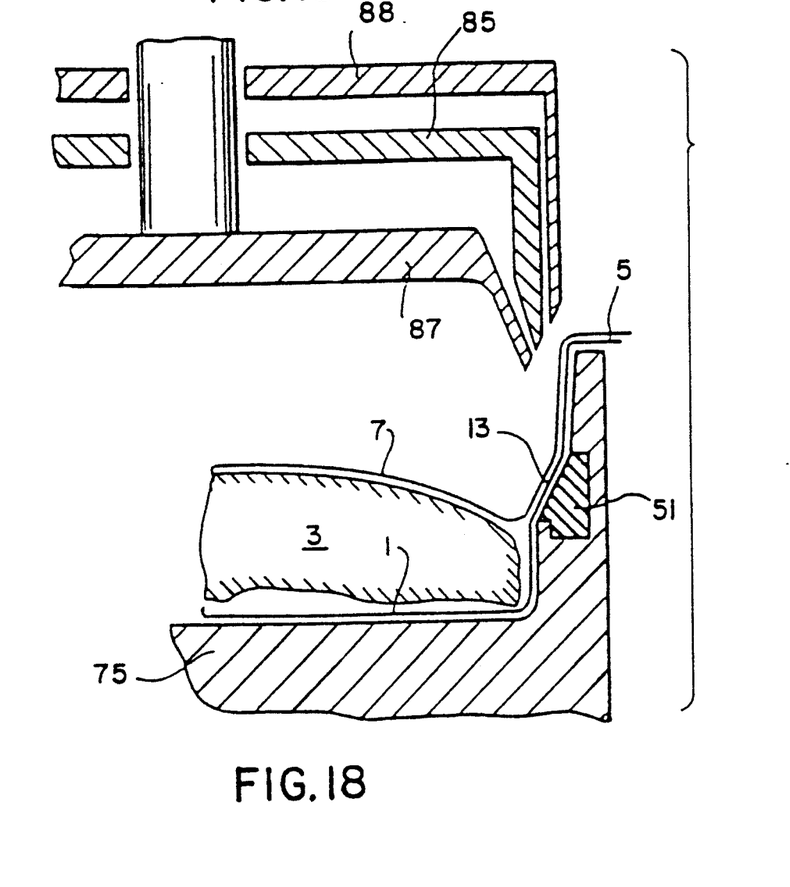
FIG. 18 is a view similar to FIG. 9 but of a different embodiment.

Referring now to FIG. 18 there is shown a variation of the embodiment shown in FIGS. 9 through 11. In this embodiment there are three moveable platens. The lower platen 87 is a cooled platen. Intermediate platen 85 is a heated platen and upper platen 88 is a cooled platen.

In use, platen 87 is lowered first, causing the skin 7 to be held at the lowermost edge of the lip 13. The upper platen 88 is then lowered causing the skin 7 to be also held at the uppermost edge of lip 13. Both the lower platen 87 and the upper plate 88 are temperature controlled and are maintained at approximately the same temperature which is below the heat welding or bonding temperature of skin 7 to web 1.

When the lower platen 87 and the upper platen 88 are lowered to hold the skin 7 onto anvil 51, over the lip 13, then the intermediate and heated platen 85 can be lowered to effect heat welding or bonding of skin 7 to web 1. All of the platens 87, 88 and 85 can then be raised.

It should be appreciated that the former skin wrapping techniques, such as those disclosed in the aforementioned PCT patent specification No. PCT/AU86/00339 require thicker skin webs 7 than the stretch technique disclosed herein. With the stretch technique for the skin 7, the thickness can be less than in the former packaging and yet enhanced holding properties are provided. Additionally, because the skin 7 can be thinner, then there can be greater permeation of gas through the skin material 7 and thus it may not always be necessary to provide the unbonded sections 65 nor the apertures 67 to assist in the gas flow from above the skin 7 to below the skin 7 and visa versa.

Further, if desired, the skin 7 may be such that for certain goods, it be substantially non-gas permeable.

In the embodiments disclosed herein it will be understood to those skilled in the art that what has been referred to hereinabove as a "skin wrapping station" is not technically the same as or equivalent to a skin wrapping station as that term is referred to in the prior art. There is no skin wrapping of the skin 7 to the goods 3, as that term is understood. This is because the skin 7 does not conform to all of the exposed surfaces of the goods above the base. There are spaces at the side edges of the goods where the skin 7 extends from the upper surface of the goods to a position where the skin is bonded to the base (at the lower lip 13), without the skin 7 engaging with the side portions of the goods.

In the embodiments disclosed, the skin 7 may be a co-extruded laminate of PE/EVA or like laminates. The EVA can be about 5 microns thickness whilst the PE an be about 20 microns thickness. The EVA laminate can be the laminate which contacts the base which may be PVC or a PVC/PE co-extruded laminate or a PVC/PVA co-extruded laminate with the EVA laminate contacting the base or a laminate of the base with a similar melt temperature. EVA has a melt temperature of approximately 80° C. which is lower than that of PE which melts at approximately 115° C. By heating to the lower melt temperature of the plastics, the skin 7 can be bonded to the base 1 whilst leaving one laminate of the skin 7 in an unmelted condition so that the tension and stretch forces remain and so that where will not be rupturing of the skin 7.

In further modifications of the present invention, the skin 7 may be bonded to the bottom 15 of a base 1 around the perimeter thereof, and wherein there is not provided a second lip 13. In this embodiment the base 1 may be of a configuration as shown in FIGS. 1 and 2. The requirement is to provide for tension forces to be provided in the skin 7 when the skin 7 is bonded to the base 1.

In a further modification the upper surface of the goods 3 may be arranged to be above the upper lip 5 of a base 1 and where the skin 7 is maintained in tension as a result of its bonding to the lip 5. In this embodiment a second lip 13 need not be provided. Thus, the packaging may have a somewhat similar configuration to that of FIG. 1 but where the lid 9 is convex and where the upper surface of the goods 3 and a desired gas are within the convex section of the lid 9.

These and other modifications may be made without departing from the ambit of the invention the nature of which is to be determined from the foregoing description and appended claims.

I claim:
1. A method for producing packaging comprising:
   a) providing a base;
   b) providing a flexible material, said base being relatively rigid compared to said flexible material;
   c) providing goods engaged against said rigid base;
   d) providing said flexible material over said goods;
   e) holding said flexible material taut;
   f) engaging only portions of said flexible material near side edges of said goods with moving means independent of said flexible material;
   g) moving said moving means relative to said material to push said flexible material only at said engaged portions so the engaged portions move to a position below the top of the goods;
   h) tensioning and stretching the intermediate portions of said flexible material between said side portions by said movement;
   i) compressing said goods to said base by said stretching and tensioning;
   j) applying a lid over said base so there will be a space between said lid and said flexible material;
   k) securing said portions of said flexible material relative to said base below the top of said goods whereby said flexible material will engage and maintain said goods held to said base as a result of such tensioning and stretching;
   l) charging a gas in said space which will enhance the preservation of the goods; and
   m) sealing said flexible material and said lid to said base with said gas in said space, said flexible material allowing said gas to pass from said space to said goods to enhance preservation of said goods.

2. A method as claimed in claim 1, wherein said flexible material is a sheet of gas permeable material, and wherein said goods are compressed toward said base by said flexible material by reducing the air pressure beneath said material wherein said goods are held to said base by both the compression applied by the tension in said flexible web and by said pressure reduction.

3. A method as claimed in claim 1, further comprising using cooled means for moving the side region of said flexible material.

4. A method as claimed in claim 1, further comprising heating a heated platen for securing said portions of said flexible material relative to said base.

5. A method as claimed in claim 4, further comprising heating a second platen for heat sealing said lid relative to said base.

6. A method as claimed in claim 1, wherein said packaging has an upper peripheral lip and a lower lip intermediate said upper lip and a bottom of said base, and wherein said web is bonded to said lower lip.

7. A method as claimed in claim 6, wherein said bonding is non-continuous whereby to provide opening means between the bonds through which gas in said packaging can pass to allow gas above said web to circulate and contact the surface of goods under said web.

* * * * *